(12) United States Patent
Kikuma et al.

(10) Patent No.: US 12,461,435 B2
(45) Date of Patent: Nov. 4, 2025

(54) PROJECTION TYPE DISPLAY DEVICE

(71) Applicant: JVCKENWOOD Corporation, Yokohama (JP)

(72) Inventors: Shinji Kikuma, Yokohama (JP);
Tadashi Furukawa, Yokohama (JP);
Yasuki Arihara, Yokohama (JP);
Takatsugu Aizaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 385 days.

(21) Appl. No.: 18/138,792

(22) Filed: Apr. 25, 2023

(65) Prior Publication Data

US 2023/0367190 A1 Nov. 16, 2023

(30) Foreign Application Priority Data

May 16, 2022 (JP) ................. 2022-080125

(51) Int. Cl.
*G03B 21/20* (2006.01)
*G03B 21/14* (2006.01)

(52) U.S. Cl.
CPC ......... *G03B 21/204* (2013.01); *G03B 21/142* (2013.01); *G03B 21/2053* (2013.01); *G03B 21/208* (2013.01)

(58) Field of Classification Search
CPC ........................ G03B 21/204; G03B 21/142; G03B 21/2053; G03B 21/208; H04N 9/3152; H04N 9/3161
See application file for complete search history.

(56) References Cited

FOREIGN PATENT DOCUMENTS

JP 2019-082645 A 5/2019

*Primary Examiner* — Ryan D Howard
(74) *Attorney, Agent, or Firm* — Nath, Goldberg & Meyer; Jerald L. Meyer

(57) ABSTRACT

A fluorescent substance is irradiated with laser light and emits illumination light of a prescribed color. A condenser lens collects the illumination light. A moving mechanism moves the fluorescent substance in a direction toward the condenser lens and in a direction away from the condenser lens. An image display element generates image light by modulating the illumination light according to an image. A light quantity adjustment mechanism adjusts the quantity of the image light by changing the size of an opening through which the illumination light or the image light passes in order to adjust the contrast of a projected image. A controller controls the moving mechanism such that the distance between the fluorescent substance and the condenser lens is a distance in association with an F-number corresponding to the adjustment state of the quantity of the image light implemented by means of the light quantity adjustment mechanism.

3 Claims, 2 Drawing Sheets

PROJECTION TYPE DISPLAY DEVICE

CROSS REFERENCE TO RELATED APPLICATION

This application is based upon and claims the benefit of priority under 35 U.S.C. § 119 from Japanese Patent Application No. 2022-080125 filed on May 16, 2022, the entire contents of which are incorporated herein by reference.

BACKGROUND

The present disclosure relates to a projection type display device.

Japanese Unexamined Patent Application Publication No. 2019-82645 discloses a projection type display device which irradiates a fluorescent substance with blue laser light emitted from a blue laser diode and projects an image by using illumination light emitted by the fluorescent substance.

SUMMARY

The projection type display device has a light quantity adjustment mechanism, what is referred to as an aperture or iris, to adjust the contrast of a projected image. If the light quantity is reduced by means of the light quantity adjustment mechanism to increase the contrast, the projected image is darkened. Therefore, it is desirable that the darkening of the image be suppressed as much as possible when the light quantity is reduced by means of the light quantity adjustment mechanism to increase the contrast.

An aspect of one or more embodiments provides a projection type display device including: a fluorescent substance that is irradiated with laser light and is configured to emit illumination light of a prescribed color; a condenser lens that is positioned at a location immediately after the fluorescent substance on a side in which the illumination light is emitted from the fluorescent substance, and is configured to collect the illumination light; a moving mechanism configured to move the fluorescent substance in a direction toward the condenser lens and in a direction away from the condenser lens; an image display element configured to generate image light by modulating the illumination light according to an image; a light quantity adjustment mechanism configured to adjust a quantity of the image light by changing a size of an opening through which the illumination light or the image light passes in order to adjust a contrast of a projected image; and a controller configured to control the moving mechanism such that a distance between the fluorescent substance and the condenser lens is a distance associated with an F-number corresponding to an adjustment state of the quantity of the image light implemented by means of the light quantity adjustment mechanism.

DETAILED DESCRIPTION

Figure 1:
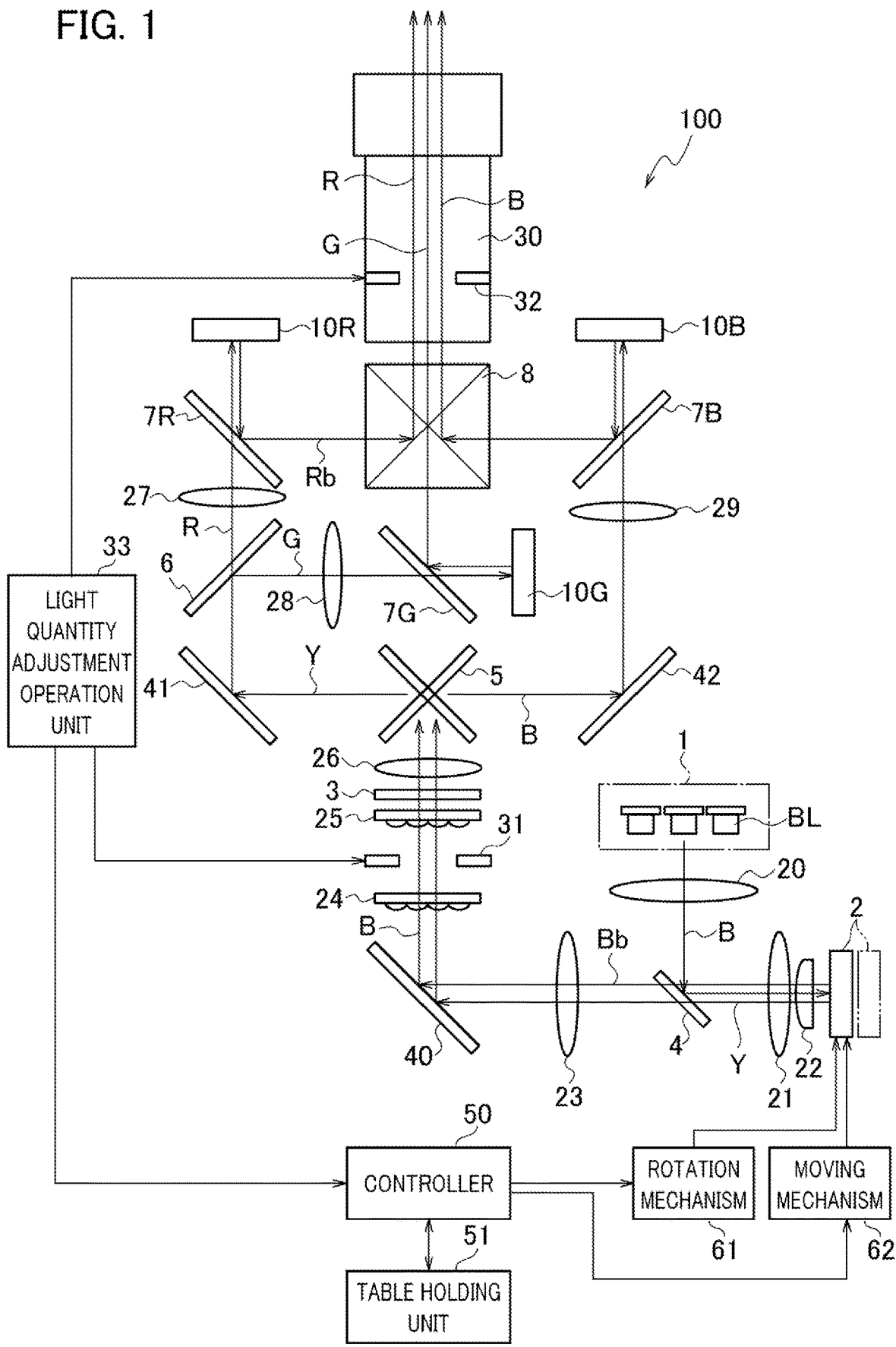
FIG. 1 is a diagram illustrating a projection type display device according to one or more embodiments.

A projection type display device according to one or more embodiments will be described below with reference to the accompanying diagrams. In FIG. 1, a projection type display device 100 according to one or more embodiments includes a light source 1, a fluorescent substance 2, a polarization conversion system (PCS) 3, a dichroic mirror 4, a cross dichroic mirror 5, a dichroic mirror 6, reflective polarization plates 7R, 7G, and 7B, a color synthesizing prism 8, and image display elements 10R, 10G, and 10B.

The projection type display device 100 also includes condenser lenses 20 to 22, a collimator lens 23, condenser lenses 26 to 29, fly-eye lenses 24 and 25, a projection lens 30, an aperture 31, an iris 32, a light quantity adjustment operation unit 33, reflection mirrors 40 to 42, a controller 50, a table holding unit 51, a rotation mechanism 61, and a moving mechanism 62.

The controller 50 may be formed of a microprocessor such as a central processing unit of a microcomputer. The table holding unit 51 may be a memory of the microcomputer or a memory such as a ROM separate from the microcomputer.

The condenser lens 22 is positioned at a location immediately after the fluorescent substance 2 on the side in which illumination light described later is emitted from the fluorescent substance 2. The condenser lens 22 is a plano-convex lens which has a flat surface on the side of the fluorescent substance 2 and a convex surface on the side of the condenser lens 21, but the condenser lens 22 may be a biconvex lens.

The light source 1 is composed of a laser array in which a plurality of blue laser diodes BL are arrayed, for example. The number of the blue laser diodes BL is not limited. The light source 1 emits blue laser light as blue illumination light. In FIG. 1, "B" denotes the blue illumination light or blue image light, which will be described later. The condenser lens 20 collects the blue illumination light emitted from the light source 1. The dichroic mirror 4 reflects the blue illumination light emitted through the condenser lens 20 and bends the light path of the blue illumination light by 90 degrees. The condenser lenses 21 and 22 collect the blue illumination light and make the collected blue illumination light enter the fluorescent substance 2.

The fluorescent substance 2 has a fluorescent layer that generates yellow illumination light, and a reflecting surface. The yellow illumination light contains a red band component and a green band component of an intensity corresponding to the energy intensity of the entered blue illumination light. The fluorescent layer of the fluorescent substance 2 receives a part of the entered blue illumination light and generates yellow illumination light. The reflecting surface of the fluorescent substance 2 reflects the generated yellow illumination light and the other part of the entered blue illumination light. Therefore, the fluorescent substance 2 emits the blue illumination light and yellow illumination light. In FIG. 1, "Y" denotes the yellow illumination light.

Instead of having the fluorescent layer that generates the yellow illumination light, the fluorescent substance 2 may be configured to have a fluorescent layer that generates red illumination light and a fluorescent layer that generates green illumination light, and to generate the red illumination light and the green illumination light separately. The fluorescent substance 2 may be irradiated with laser light and emit illumination light of a prescribed color.

The fluorescent substance 2 is circular, and FIG. 1 shows the side surfaces of the circular fluorescent substance 2. In order to suppress a temperature rise of the fluorescent substance 2 and extend the life of the fluorescent substance 2, the fluorescent substance 2 is configured to rotate by means of the rotation mechanism 61. The controller 50 controls the rotation of the fluorescent substance 2 by means of the rotation mechanism 61.

The blue illumination light and yellow illumination light emitted from the fluorescent substance 2 pass through the condenser lens 22, the condenser lens 21, and the dichroic mirror 4 in this order and enter the collimator lens 23. The collimator lens 23 forms the entered blue illumination light and yellow illumination light into parallel light and causes the light to enter the reflection mirror 40.

The reflection mirror 40 reflects the blue illumination light and yellow illumination light, bends the light paths of the blue illumination light and yellow illumination light by 90 degrees, and causes the light to enter the fly-eye lens 24. The fly-eye lenses 24 and 25 homogenize the illumination distribution of the entered blue illumination light and yellow illumination light. The PCS 3 adjusts the entered blue illumination light and yellow illumination light to p-polarized light. The blue illumination light and yellow illumination light emitted from the PCS 3 enters the cross dichroic mirror 5 through the condenser lens 26. The cross dichroic mirror 5 separates the blue illumination light from the yellow illumination light.

The reflection mirror 41 reflects the separated yellow illumination light, bends the light path of the yellow illumination light by 90 degrees, and causes the light to enter the dichroic mirror 6. The dichroic mirror 6 reflects a green band component included in the yellow illumination light as green illumination light, allows a red band component included in the yellow illumination light to pass therethrough as red illumination light, and separates the yellow illumination light into the green illumination light and red illumination light. In FIG. 1, "G" denotes the green illumination light or green image light, which will be described later, and "R" denotes the red illumination light or red image light, which will be described later.

The red illumination light separated by means of the dichroic mirror 6 enters the reflective polarization plate 7R through the condenser lens 27. The red illumination light passes through the reflective polarization plate 7R and enters the image display element 10R. The image display element 10R light-modulates the entered red illumination light according to a red component of image data and emits s-polarized red image light. The red image light is reflected by the reflective polarization plate 7R and enters the color synthesizing prism 8.

The green illumination light separated by means of the dichroic mirror 6 enters the reflective polarization plate 7G through the condenser lens 28. The green illumination light passes through the reflective polarization plate 7G and enters the image display element 10G. The image display element 10G light-modulates the entered green illumination light according to a green component of image data and emits s-polarized green image light. The green image light is reflected by the reflective polarization plate 7G and enters the color synthesizing prism 8.

The reflection mirror 42 reflects the blue illumination light separated by means of the cross dichroic mirror 5, bends the light path of the blue illumination light by 90 degrees, and causes the light to enter the reflective polarization plate 7B through the condenser lens 29. The blue illumination light passes through the reflective polarization plate 7B and enters the image display element 10B. The image display element 10B light-modulates the entered blue illumination light according to a blue component of image data and emits s-polarized blue image light. The blue image light is reflected by the reflective polarization plate 7B and enters the color synthesizing prism 8.

The reflective polarization plates 7R, 7G, and 7B can be composed of a wire grid, for example.

The color synthesizing prism 8 reflects the blue image light and red image light, allows the green image light to pass therethrough, and synthesizes the red image light, green image light, and blue image light. The projection lens 30 projects the synthesized image light onto a screen (not shown) and displays a full-color image.

In the projection type display device 100 configured as described above, the aperture 31 is interposed between the fly-eye lens 24 and the fly-eye lens 25. The iris 32 is arranged inside a lens barrel of the projection lens 30. The aperture 31 is configured such that the size of an opening (a first opening) through which the blue illumination light and yellow illumination light pass can be changed by widening or narrowing the opening. The iris 32 is configured such that the size of an opening (a second opening) through which synthetic light emitted from the color synthesizing prism 8 passes can be changed by widening or narrowing the opening.

By operating the light quantity adjustment operation unit 33, the user can adjust the size of the opening of either the aperture 31 or the iris 32 or the openings of both the aperture 31 and the iris 32 and adjust the quantity of the image light projected by the projection lens 30. The aperture 31 and the iris 32 function as a light quantity adjustment mechanism for adjusting the quantity of the image light. The user operates the light quantity adjustment operation unit 33 and adjusts the quantity of light to adjust the contrast of the projected full-color image.

Specifically, in order to increase the contrast of the full-color image, the user operates the light quantity adjustment operation unit 33, reduces the size of the opening of at least one of the aperture 31 and the iris 32, and reduces the quantity of light. The light quantity adjustment mechanisms shown in FIG. 1 are configured such that the light quantity can be adjusted in multiple steps by combining an adjustment in multiple steps of the size of the opening of the aperture 31 with an adjustment in multiple steps of the size of the opening of the iris 32. The adjustment state of the quantity of the image light is determined depending on the combination thereof. This can adjust the light quantity in more steps than when the light quantity is adjusted by using only the aperture 31 or iris 32.

If the light quantity is reduced by means of the light quantity adjustment mechanisms, the contrast is improved but the projected full-color image becomes darker. To cope with the above, the projection type display device 100 has the moving mechanism 62 that moves the fluorescent substance 2 in the direction of the optical axis so as to adjust the distance between the fluorescent substance 2 and the condenser lens 22. The moving mechanism 62 moves the fluorescent substance 2 in the direction toward the condenser lens 22 and in the direction away from the condenser lens 22. The controller 50 controls the movement of the fluorescent substance 2 by means of the moving mechanism 62.

The moving mechanism 62 integrally moves the fluorescent substance 2 and the rotation mechanism 61 that rotates the fluorescent substance 2. As an example, a ball screw is rotated by a motor, and a base on which the fluorescent substance 2 and the rotation mechanism 61 are mounted may be moved by using the ball screw.

The yellow illumination light emitted from the fluorescent substance 2 is perfectly scattered light. Therefore, if the fluorescent substance 2 is positioned closer to the condenser lens 22 as the size of the openings of the aperture 31 and iris 32 becomes larger, the full-color image becomes brighter.

Alternatively, if the fluorescent substance 2 is positioned further away from the condenser lens 22 as the size of the openings of the aperture 31 and iris 32 becomes smaller, the full-color image becomes brighter.

Therefore, the controller 50 controls the moving mechanism 62 such that when the size of the openings of the aperture 31 and iris 32 is the maximum, the fluorescent substance 2 is positioned at a location at which the fluorescent substance 2 is closest to the condenser lens 22 and which is indicated by a solid line. Alternatively, the controller 50 controls the moving mechanism 62 such that when the size of the openings of the aperture 31 and iris 32 is the minimum, the fluorescent substance 2 is positioned at a location at which the fluorescent substance 2 is farthest from the condenser lens 22 and which is indicated by a two-dot chain line. The controller 50 controls the moving mechanism 62 such that the fluorescent substance 2 is positioned between the location indicated by the solid line and the location indicated by the two-dot chain line depending on the size of the openings of the aperture 31 and iris 32.

Figure 2:
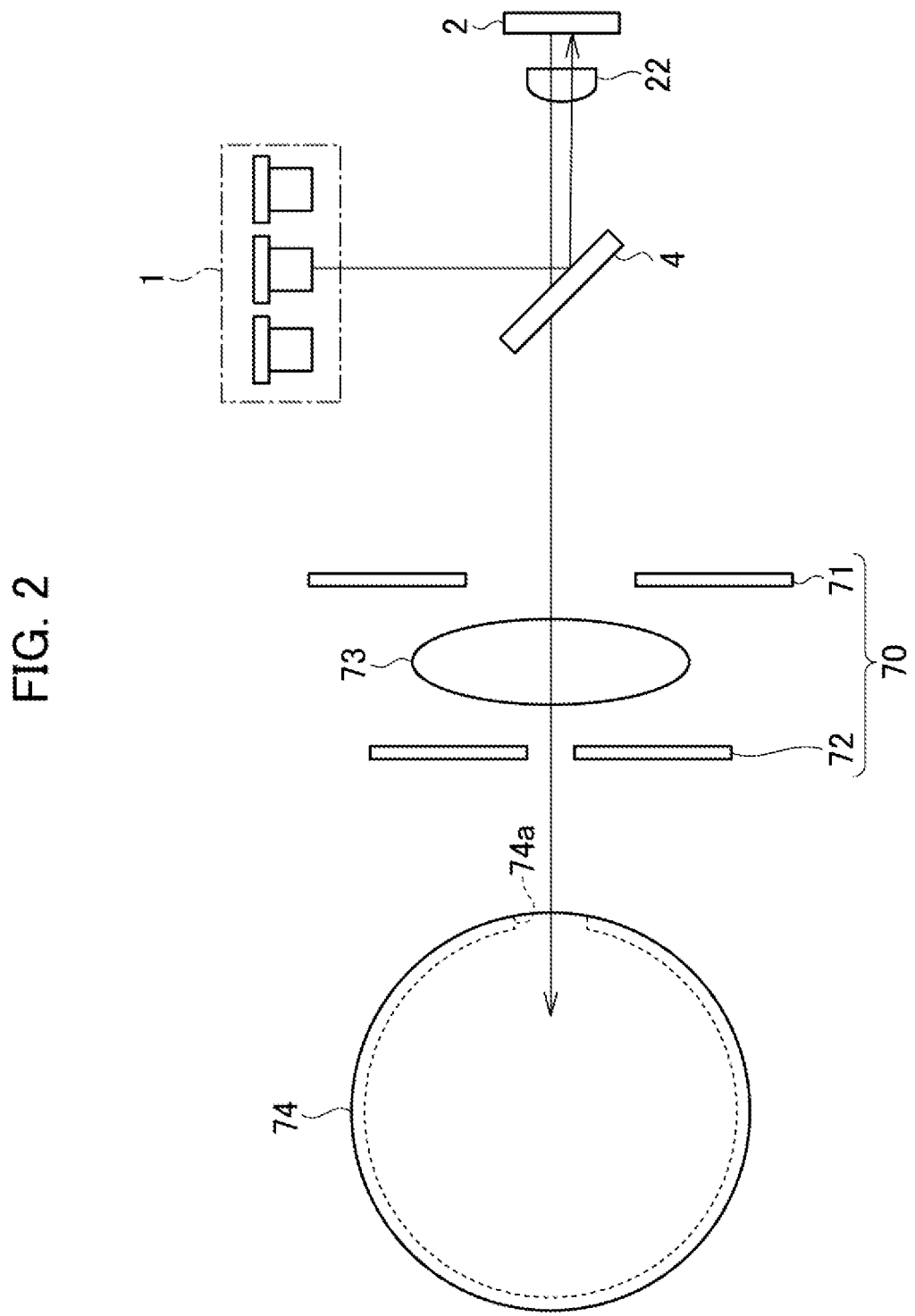
FIG. 2 is a diagram illustrating an example of a configuration of a brightness measuring device.

The distance between the fluorescent substance 2 and the condenser lens 22 at which the brightness of the full-color image is the maximum can be determined in advance by using a brightness measuring device shown in FIG. 2. In FIG. 2, the same parts as those in FIG. 1 are denoted with the same reference numerals, and descriptions thereof are omitted. As shown in FIG. 2, the blue illumination light and yellow illumination light that have been emitted from the fluorescent substance 2 and have passed through the condenser lens 22 and dichroic mirror 4 enter the inside of an integrating sphere type power meter 74 from an opening 74*a* through a first aperture 71, a lens 73, and a second aperture 72. The first aperture 71 and second aperture 72 configure an F-number adjustment aperture 70.

The opening of the second aperture 72 may be small and fixed. When the size of the opening of the first aperture 71 is changed, the F-number of the optical system of the brightness measuring device shown in FIG. 2 changes. If the size of the opening of the first aperture 71 is increased, the F-number decreases, and alternatively if the size of the opening of the first aperture 71 is decreased, the F-number increases. A measuring person adjusts the F-number in multiple steps by using the F-number adjustment aperture 70, and determines the distance between the condenser lens 22 and the fluorescent substance 2, measured by the power meter 74, at which the brightness of the light emitted from the dichroic mirror 4 is the maximum at each F-number.

The measuring instrument for measuring the brightness of the light emitted from the dichroic mirror 4 is not limited to the integrating sphere type power meter 74.

In FIG. 1, the table holding unit 51 holds a table showing the correspondence relationship between each F-number and the distance between the fluorescent substance 2 and the condenser lens 22 at which the brightness of the light emitted from the dichroic mirror 4 is the maximum, which are obtained in advance by using the brightness measuring device shown in FIG. 2. Information that the brightness of the light emitted from the dichroic mirror 4 is the maximum means that the brightness of the projected full-color image is the maximum. That is, the table held in the table holding unit 51 shows the correspondence relationship between each F-number and the distance between the fluorescent substance 2 and the condenser lens 22 at which the brightness of the projected full-color image is the maximum.

As described above, in order to adjust the contrast of the projected full-color image, the user operates the light quantity adjustment operation unit 33 and the light quantity of the image light is adjusted by means of the light quantity adjustment mechanisms. A value indicating the adjustment state of the light quantity implemented by means of the light quantity adjustment operation unit 33 is input to the controller 50. The value indicating the adjustment state of the light quantity may be a value indicating a step when the light quantity is adjusted in multiple steps. The controller 50 converts the value indicating the step of the light quantity adjustment into an F-number of the projection type display device 100. The F-number is associated with the step of the light quantity adjustment by means of the controller 50. Therefore, the table held in the table holding unit 51 shows the correspondence relationship between each F-number and the distance between the fluorescent substance 2 and the condenser lens 22 at which the brightness of the projected full-color image becomes the maximum in the step of the light quantity adjustment corresponding to each F-number.

The F-number of the projection type display device 100 is determined depending on the focal length of a plurality of lenses and the size of the openings of the aperture 31 and iris 32 in the projection type display device 100. Therefore, the F-number of the projection type display device 100 can be obtained by means of calculation. The controller 50 may hold in advance the F-number corresponding to the value indicating the step of the light quantity adjustment or may obtain the F-number by means of calculation each time the step of the light quantity adjustment is changed.

With reference to the table held in the table holding unit 51, the controller 50 reads the distance between the fluorescent substance 2 and the condenser lens 22 stored in association with the F-number corresponding to the value indicating the step of the light quantity adjustment. The controller 50 controls the moving mechanism 62 such that the distance between the fluorescent substance 2 and the condenser lens 22 is the read distance. In this way, the controller 50 controls the moving mechanism 62 such that the distance between the fluorescent substance 2 and the condenser lens 22 is the distance associated with the F-number corresponding to the adjustment state of the quantity of the image light implemented by means of the light quantity adjustment mechanisms.

Therefore, even if the user reduces the quantity of the image light by changing the size of the opening through which the illumination light or the image light passes in order to increase the contrast of the projected full-color image, the degree of darkening of the projected full-color image can be minimized.

The present invention is not limited to the one or more embodiments described above and various modifications are possible without deviating from the gist of the present invention. FIG. 1 shows the three-plate projection type display device 100 having the image display elements 10R, 10G, and 10B that modulate illumination light of three primary colors, but the projection type display device may be a single-plate projection type display device having image display elements that modulate illumination light of a single color. That is, the projected image may be a monochrome image instead of a full-color image.

What is claimed is:
1. A projection type display device comprising:
   a fluorescent substance that is irradiated with laser light and is configured to emit illumination light of a prescribed color;

a condenser lens that is positioned at a location immediately after the fluorescent substance on a side in which the illumination light is emitted from the fluorescent substance, and is configured to collect the illumination light;

a moving mechanism configured to move the fluorescent substance in a direction toward the condenser lens and in a direction away from the condenser lens;

an image display element configured to generate image light by modulating the illumination light according to an image;

a light quantity adjustment mechanism configured to adjust a quantity of the image light by changing a size of an opening through which the illumination light or the image light passes in order to adjust a contrast of a projected image; and a controller configured to control the moving mechanism such that a distance between the fluorescent substance and the condenser lens is a distance associated with an F-number corresponding to an adjustment state of the quantity of the image light implemented by means of the light quantity adjustment mechanism.

2. The projection type display device according to claim 1, wherein
the light quantity adjustment mechanism comprises:
an aperture configured to change, in multiple steps, a size of a first opening through which the illumination light passes; and
an iris configured to change, in multiple steps, a size of a second opening through which the image light passes, wherein
the adjustment state of the quantity of the image light is determined depending on a combination of a step for the size of the first opening and a step for the size of the second opening.

3. The projection type display device according to claim 1, further comprising:
a table holding unit configured to hold a table showing a correspondence relationship between each F-number and a distance between the fluorescent substance and the condenser lens at which a brightness of a projected image becomes a maximum, in a light quantity adjustment step corresponding to each F-number, wherein
the controller refers to the table, reads a distance between the fluorescent substance and the condenser lens stored in association with an F-number, and controls the moving mechanism such that a distance between the fluorescent substance and the condenser lens is the read distance.

* * * * *